No. 849,348. PATENTED APR. 2, 1907.
W. C. GEGLER.
WETTER UP FOR LEATHER WORKING MACHINES.
APPLICATION FILED AUG. 16, 1906.
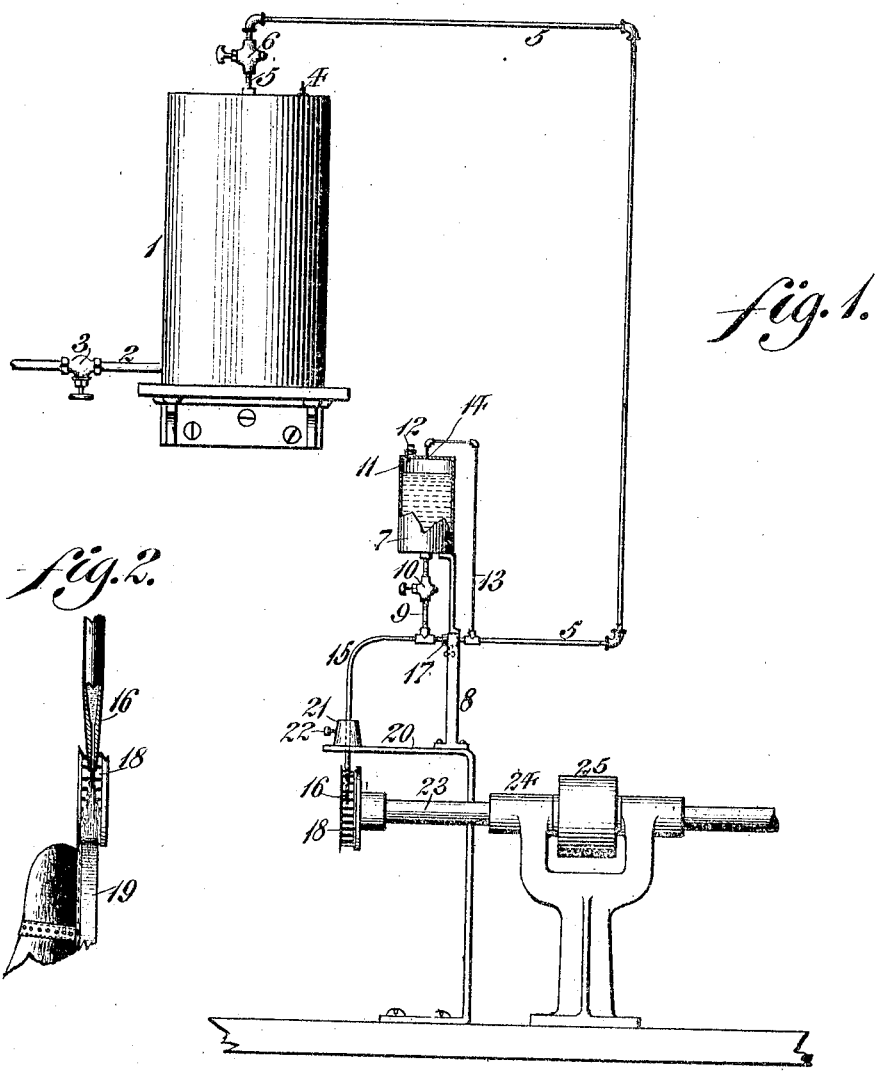
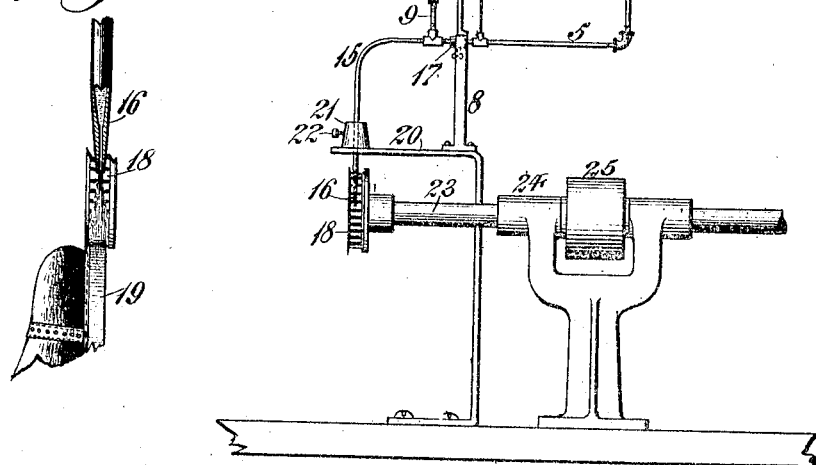
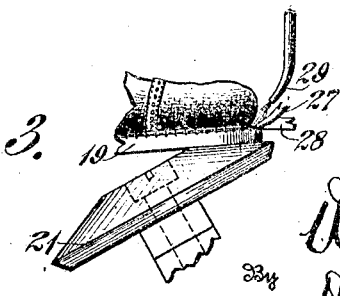
Witnesses
L. Douville,
P. F. Nagle.
Inventor
William C. Gegler
By Diederheim + Fairbank
Attorneys

UNITED STATES PATENT OFFICE.

WILLIAM C. GEGLER, OF PHILADELPHIA, PENNSYLVANIA.

WETTER-UP FOR LEATHER-WORKING MACHINES.

No. 849,348.　　Specification of Letters Patent.　　Patented April 2, 1907.

Application filed August 16, 1906. Serial No. 330,918.

*To all whom it may concern:*

Be it known that I, WILLIAM C. GEGLER, a citizen of the United States, residing in the city and county of Philadelphia, State of Pennsylvania, have invented a new and useful Wetter-Up for Leather-Working Machines, of which the following is a specification.

The object of this device is to eliminate hand labor and former hand methods by spraying the moisture entirely under the control of the operator, thereby entirely doing away with the disadvantages which occur in cutting operations and which I have typified in edge-trimming machines.

It will trim and otherwise treat and mechanically wet up at one and the same operation. It produces a smooth and ebony finish and allows the ink to penetrate and retain its virtue. There is no spilling of the wetting liquid and cleaner work is necessarily produced, all danger of defacing the most delicate stock being eliminated. It is suitable for all types of leather-working machines, and I have illustrated it in connection with a stitch-separating machine also to indicate by this other highly advantageous use that it has a wide application.

Figure 1 represents an elevation of the structure embodying my invention, a portion of one tank being broken away. Fig. 2 represents an enlarged elevation, partly in section, of a cutter and moistener shown as operating upon a shoe-sole. Fig. 3 represents my wetter-up applied to a different operating mechanism.

I do not make claim in this application to the process of wetting-up, for the reason that I claim it in a separate application copending herewith and serially numbered 336,153.

Similar numerals of reference indicate corresponding parts in the figures.

Referring to the drawings, I have shown my mechanism applied to shoe-working machinery; but it is equally applicable to a large variety of other machinery intended for work upon leather and wherever moisture is applied to the leather preparatory to the working of the same.

1 designates a tank intended for the storage and drainage of a supply of compressed fluid, preferably air, furnished through the pipe 2 and controlled by the valve 3. The tank is protected by pressure-valve 4, and air is supplied for the purposes required through the pipe 5, controlled by the valve 6. Preferably in proximity to the point of application of the moisture a tank 7 is supported in any manner, as by a brace 8 above the pipe 5, and connected to said pipe 5 through a pipe 9 entering the tank 7, preferably near or at the bottom of the tank. The valve 10 controls the flow of the liquid from the tank into the pipe. At the top of the tank is any suitable filling-opening 11, capable of being protected by a plug 12. The pipe 13 connects the pipe 5 with the top of the tank at 14, tapping the pipe 5 between the point at which the pipe 9 engages it and the tank 1.

The pipe 15 terminates in a nozzle 16 of such shape that the liquid from the tank 7 under the pressure of the air and commingling with any desirable quantity of air as furnished by valve 17 is sprayed from the end of the nozzle. The width and extent of the spray depends upon the shape of the nozzle and the pressure of the air, as well as upon the amount of air which is allowed to mix with the liquid. The nozzle 16 is applied in proximity to the cutter or other operating-tool 18 in such a manner that the spray reaches the material 19 to be operated upon a short distance from the portion being acted upon by the cutter and behind it in direction of the feed of the goods to the cutter. The pipe 15 is braced in proximity to the spraying-nozzle in the form shown in Fig. 1 by the arm 20 and collar 21, within which set-screw 22 permits vertical adjustment. The cutter 18 in the form shown is driven by the shaft 23, supported in bearings 24 and carrying the portion 25.

In Fig. 3 I have shown a rotary feed-table 26, upon which a shoe is supported for another operation than the trimming of the finished sole shown in Fig. 2—namely, for stitch-separating by means of the indenter or marker 27, the shoe being held against the guide 28 and moistened by nozzle 29, which in this case is inwardly directed, as shown.

It will be evident that other applications in this invention may be made within the scope of my claims.

It will be understood that various operating-tools besides those which actually remove a portion of the surface will be improved in their operation by the application of my spray. Thus the indenting and compressing appliances incident to stitch separation will work better in conjunction with my spray, the vapor improving the quality of the work by supplying a suitable amount of moisture without excessive wetting of the surface acted upon and spoiling of adjoining surfaces. When seams are opened up, likewise the opening-tool may carry a spraying-nozzle to wet up the surface or surfaces thereof.

Having thus described my invention, what I claim as new, and desire to secure by Letters Patent, is—

1. In a device of the character described, an operating-tool, a nozzle in proximity thereto, a liquid-container, and means for forcing the liquid through the nozzle for producing a spray.

2. In a device of the character described, an operating-tool, a nozzle in proximity thereto, a source of fluid-supply and means for mixing air under pressure with said fluid-supply.

3. In a device of the character described, an operating-tool, a nozzle in proximity thereto and in the rear thereof and means for forcing fluid through said nozzle to form a spray thereof.

WILLIAM C. GEGLER.

Witnesses:
W. S. JACKSON,
J. C. McGLASHEN.